United States Patent [19]

Osrow et al.

[11] 4,415,323
[45] Nov. 15, 1983

[54] PASTA-MAKING KITCHEN APPLIANCE WITH A DRYING ARRANGEMENT

[75] Inventors: Harold Osrow, Dix Hills; Elliott Shulman, East Northport, both of N.Y.

[73] Assignee: Osrow Products Corporation, Old Bethpage, N.Y.

[21] Appl. No.: 315,536

[22] Filed: Oct. 27, 1981

[51] Int. Cl.³ .......................... A21C 3/04; A21C 11/16
[52] U.S. Cl. ................................ 425/72 S; 425/376 R
[58] Field of Search .................... 425/72 R, 72 S, 464, 425/815, 376 R, 378 R, 378 S; 74/206; 319/371

[56] References Cited

U.S. PATENT DOCUMENTS

| | | | |
|---|---|---|---|
| 855,438 | 5/1907 | Ebel | 425/72 |
| 2,123,763 | 7/1938 | Zaiger | 74/206 |
| 2,565,626 | 8/1951 | Prince et al. | 74/206 |
| 2,904,317 | 9/1959 | Copeland et al. | 219/371 |
| 3,089,942 | 5/1963 | Wrigglesworth et al. | 219/371 |
| 3,959,057 | 5/1976 | Smith | 425/72 S |

FOREIGN PATENT DOCUMENTS

| | | | |
|---|---|---|---|
| 860335 | 10/1952 | Fed. Rep. of Germany | |
| 549363 | 10/1956 | Italy | |
| 677241 | 8/1952 | United Kingdom | 74/213 |

*Primary Examiner*—Willard E. Hoag
*Attorney, Agent, or Firm*—Kirschstein, Kirschstein, Ottinger & Cobrin

[57] ABSTRACT

A kitchen appliance for producing pasta or dough products, such as spaghetti, noodles, macaroni and similar cross-sectionally solid or tubular products, or sheets of farinaceous material includes an air blower which directs a stream of air against the respective products as they emerge from the respective orifices of an extrusion die, so that at least the surfaces of such products are dried and their original tackiness is removed, with the result that such products cannot adhere to one another any longer even if they are wetter at the moment of leaving the extrusion orifices than heretofore customary. The air blower is mounted in rotatable relationship with the output shaft of the motor, which powers the mixing and extruding screw accommodated in the housing of the appliance, for rotation thereof relative to the output shaft, and a step-up transmission is provided which rotates the blower at an angular speed considerably exceeding that of the output shaft. A guiding duct is mounted on a frame rigid with the housing in a removable manner and has an inclined section which diverts the substantially horizontal stream of air emerging from the housing in an upward direction and toward the region at which the products emerge from the extrusion die.

18 Claims, 8 Drawing Figures

PASTA-MAKING KITCHEN APPLIANCE WITH A DRYING ARRANGEMENT

BACKGROUND OF THE INVENTION

1. Field of the Invention

The present invention generally relates to pasta-making kitchen appliances and, more particularly, to appliances of this kind which are capable of producing elongated or sheet-like farinaceous products and which are suited for household use.

2. Description of the Prior Art

There are already known various kitchen appliances of this type, for instance, that disclosed in U.S. Pat. No. 4,146,333, which are capable of initially mixing the ingredients of dough or pasta material and finally of kneading and extruding such materials. Another such construction which is particularly suited for household use is disclosed in a commonly owned U.S. patent application Ser. No. 184,351. In this latter construction, a mixing chamber is formed in the interior of the housing of the appliance where the incipient dough or alimentary pasta ingredients are being mixed to the desired consistency by mixing blades when the electric motor is driven in one sense, and where a conveyor screw mounted on the same shaft as the mixing blades and rotatable therewith kneads and simultaneously forces the dough or pasta material forwardly toward and through the orifices of an extrusion die when the electric motor operates in the opposite sense. As advantageous as this construction is in many respects, experience therewith has shown that a careful balance must be struck between a too high and a too low viscosity of the pasta material, that is, between too much and too little of the liquid ingredient or ingredients if operating problems are to be avoided. This degree of precision, unfortunately, cannot be expected from the average homemaker.

If the farinaceous material, such as dough or pasta material, contains too little liquid, it may be brittle so that the mixing thereof will be impaired, and the products will break at least at intervals upon emerging from the extrusion orifices, slots or similar openings of the extrusion die. This, of course, is very disadvantageous. However, problems are encountered even if the amount of liquid in the farinaceous material is high enough to avoid such problems. More particularly, when the liquid content is in the desired range, the farinaceous material is quite tough so that the components of the kitchen appliance which act thereon will be subjected to a substantial wear, and the life span of the kitchen appliance will be reduced accordingly, especially in a kitchen appliance for household use where highly wear-resistant material cannot be used for reasons of their weight and cost. On the other hand, when the material emerging from the orifices or slots of the extrusion die contains too much of the liquid ingredients, the external surfaces of the elongated products are tacky so that the individual products can adhere to one another after they have emerged from the extrusion orifices and traveled a certain distance beyond the same, which adhesion is very difficult to overcome without destroying or damaging the products.

SUMMARY OF THE INVENTION

1. Objects of the Invention

Accordingly, it is a general object of the present invention to avoid the disadvantages of the prior art.

More particularly, it is an object of the invention to develop a pasta-making kitchen appliance which is not possessed of the disadvantages of the conventional appliances of this type.

Still another object of the present inventon is to so construct the appliance of the type here under consideration as to reduce the wear and energy consumption thereof.

It is yet another object of the invention to provide a pasta-making appliance in which the liquid contents of the pasta or dough material need not be kept in a narrow critical range.

A concomitant object of the invention is to so design the kitchen appliance as to be simple in construction, easy to manufacture, and reliable in operation nevertheless.

2. Features of the Invention

In pursuance of these objects and others which will become apparent hereinafter, one feature of the present invention resides in a kitchen appliance for producing elongated products from farinaceous materials which comprises, in combination, housing means defining an internal chamber for accommodating a quantity of the respective farinaceous material and including an external wall; extrusion die means mounted on said external wall and having at least one opening communicating the internal chamber with the exterior of the housing means; means for expelling the material through the opening of the extrusion means to form the respective elongated product; means for driving the expelling means, including an electric motor; and means for directing a stream of air against the elongated product at a region of the latter adjacent to the point of emergence thereof from the opening of the extrusion means for drying at least the surface of such elongated product and reducing its tackiness.

Several important advantages are obtained when the kitchen appliance is constructed in the above-mentioned manner. So, for instance, due to the fact that the farinaceous material can and usually will have a higher liquid content and thus a lower viscosity than heretofore customary, the motor need not work as hard as before either during the initial mixing phase, or during the subsequent kneading and extrusion phase, of operation of the appliance, so that the useful life span thereof is extended. On the other hand, a lower horsepower and, consequently, less expensive and less bulky, motor can be used. Furthermore, the stress and strain on the various components, such as on the walls bounding the internal chamber, on the extrusion die, and on the mixing and extruding elements, is also reduced so that the danger of damage to these components during the operation of the kitchen appliance and the amount of wear of such components are reduced to a minimum. Yet, despite the fact that the material leaving the extrusion orifice has a higher liquid content than heretofore customary and, consequently, the surface of the product is tackier, the possibility of adhesion of different products to one another, or of different portions of the same product to each other, is actually lower than before, inasmuch as the air stream directed against the products effectively separates the latter in that it penetrates between the individual products and also acts thereon against the gravitational forces, so that these products will travel, after leaving the extrusion orifices, for a substantial distance in trajectories having only a small downward slope, with the result that the original distances between such products remain virtually unchanged, rather than rapidly diminishing as they would if the slope were greater. On the other hand, by the time the gravity pull substantially increases the downward slope of such trajectories, the products have already been sufficiently dried at least at their exposed surfaces to avoid adherence thereof to one another after contacting each other due to the diminished distances therebetween or to other factors. Moreover, the higher liquid content of the material and the resulting lower viscosity thereof improves the cohesion of such material, and the thorough mixing thereof, as well as renders it possible to produce thinner products than heretofore possible or practicable by selecting correspondingly smaller cross sections for the orifices of an additional die, with the corresponding increase in the variety of products which can be produced by the kitchen appliance.

According to one aspect of the present invention, the aforementioned directing means for the air stream includes blower means; means for supporting the blower means in a predetermined position relative to the housing means; means for rotating the blower means; and means for guiding the stream of air impelled by the blower means toward the above-mentioned region. Advantageously, the housing means includes an opening in the external wall, the electric motor has a reversible output shaft which has an end portion that extends toward the opening of the housing means, the blower means is rotatably mounted on the end portion of the output shaft within the housing means, and the guiding means includes a duct defining a channel communicating with the opening of the housing means and aimed at the above-mentioned region.

In this construction, it is especially advantageous when, in accordance with a further facet of the present invention, the blower means is mounted on the end portion of the output shaft for free rotation relative thereto in either circumferential direction, and when the rotating means includes a transmission interposed between the output shaft and the blower means and operative for rotating the blower means at an angular speed exceeding that of the output shaft. Such a transmission may advantageously include the first pulley mounted on the output shaft for joint rotation therewith, a second and a third pulley mounted in the housing means for joint rotation about an axis parallel to and laterally offset from that of the output shaft, a fourth pulley rigid with the blower means, and a first and a second endless element respectively trained about the first and second, and the third and fourth, pulleys.

In another advantageous construction, the blower means is mounted on a stub shaft for joint rotation therewith in either circumferential direction about an axis laterally offset from the output shaft. The rotating means includes a transmission operatively interconnected between the output and stub shafts for rotating the blower means at an angular speed exceeding that of the output shaft. The transmission includes a clutch movable between a disengaged and an engaged position in which the output and stub shafts are operatively disconnected and connected, respectively. A manually-operable actuator member moves the clutch between its positions. Such a clutch may advantageously include a first clutch member rigidly mounted on the output shaft, and having a circular flange surrounding the latter; and a second clutch member having a circular friction belt rigidly mounted on the stub shaft, and engaging the inner circumferential wall of the flange when the actuator has moved the clutch to its engaged position.

It is particularly advantageous when the kitchen appliance further comprises means for heating the air impelled by the blower means, especially when the heating means includes means for conducting the air flowing toward the blower means past such portions of the electric motor which become heated during the operation of the latter. In this manner, there are simultaneously obtained two advantages: on the one hand, the electric motor is effectively cooled due to the increased speed of rotation of the blower means as compared to the speed of rotation in one circumferential direction of the output shaft of the motor; on the other hand, the air impelled by the blower means, which is rotated in the opposite circumferential direction by the output shaft, and directed against the products to be dried is warm or hot, which further speeds up the drying of the products.

A particularly simple and otherwise advantageous construction is obtained when the housing means, especially the exposed wall thereof, includes a frame surrounding the opening provided in the exposed wall of the housing means, this frame mounting the duct on the housing means. Advantageously, the frame is rectangular, and the duct has a corresponding rectangular cross section. In a currently preferred construction of the kitchen appliance according to the present invention, the frame is disposed centrally below the extrusion due, and the duct includes a substantially horizontal upper wall, two opposite substantially vertical lateral walls, and a bottom or lower wall including at least a section which is inclined at a predetermined acute angle with respect to the horizontal so as to be operative for diverting the air stream impelled by the blower means and emerging substantially horizontally out of the opening of the housing means upwardly toward the aforementioned region.

The frame may advantageously be open on one of its sides so that it mounts the duct for sliding displacement relative to the frame through the open side of the latter for removal of the duct from the housing means. There may further be provided a closing plate which capable of being mounted on the frame instead of the duct for obstructing the opening of the housing means, if desired.

The kitchen appliance may also advantageously be equipped with means for streamling the flow of air impelled by the blower means prior to the entry thereof into the duct, this streamlining means advantageously including a grille disposed in the opening of the housing means. Excellent results are obtained when the grille includes two intersecting arrays of parallel slats which extend substantially at right angles to one another as between the arrays. The grille may further include, in accordance with another advantageous feature of the present invention, four corner portions which together define a circular opening in the grille that is aligned with the blower means and that is traversed by the slats.

The novel features which are considered as characteristic of the present invention are set forth in particular in the appended claims. The improved pasta-making kitching appliance itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
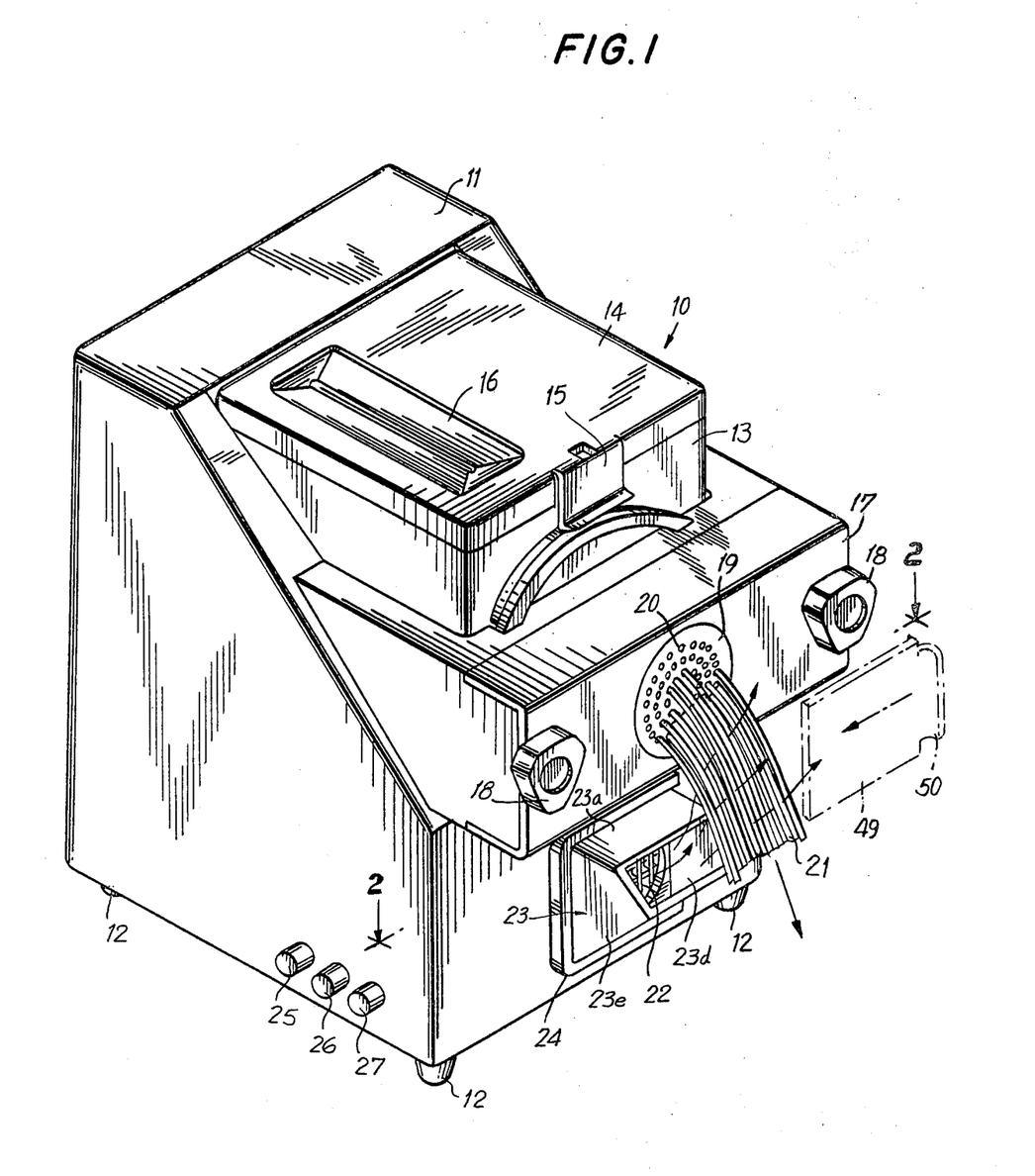
FIG. 1 is a perspective view of a pasta-making kitchen appliance constructed in accordance with one embodiment of the present invention.

Referring now to the drawing in detail, and first to FIG. 1 thereof, it may be seen that the reference numeral 10 has been used to identify a pasta-making kitchen appliance, preferably for household use, in its entirety. The kitchen appliance 10 shown in the drawing is of the type disclosed in detail in the copending application Ser. No. 184,351 which is assigned to the same assignee as the present application, to which reference may be had for background information and for details of structure which are mentioned herein only to the extent necessary for understanding the present invention, and the contents of which is incorporated herein to the extent needed for furnishing information which is not explicitly contained in this application. However, it will be appreciated as the description proceeds that the expedients discussed herein and constituting the contribution of the present invention to the art may as well be used in other kitchen appliances of the type here under consideration but having construction differing from that discussed herein, so long as such differently constructed kitchen appliances can be modified to incorporate such expedients.

The kitchen appliance 10 as illustrated in the drawing and as disclosed in detail in the aforementioned copending application is so constructed as to be capable of initially mixing the solid ingredients, such as flour, salt, sugar, or fat, with liquid ingredients, such as water, eggs, milk, or oil, of a farinaceous substance, and of thereupon kneading and extruding such substance, to produce elongated products therefrom. Depending on the kind and quantity of the solid and liquid ingredients, the farinaceous substance can be called dough or pasta, and the products obtained therefrom can be classified as various sweet or salty dough products or pasta products. However, to simplify the description, the kitchen appliance 10 will be described as constructed, assembled and operated for the production of pasta products from pasta material.

The pasta-making kitchen appliance 10 as shown in FIG. 1 includes a housing 11 which is provided with a plurality of legs 12, preferably three or four. The supporting legs 12 are so arranged at the bottom surface of the housing 11 as to reliably support the kitchen appliance 10 on an even surface, such as on a counter, at least during the use of the kitchen appliance 10. The housing 11 is preferably made of a synthetic plastic material so as to keep the cost and the weight of the kitchen appliance 10 low and thus to make the latter acceptable for household use.

The housing 11 includes a receptacle 13 which is integral with the remainder of the housing 11 and is equipped with a lid 14 having a handgrip portion 15 that can be engaged by the user of the kitchen appliance 10 in order to displace the lid 14 between its closed position shown in FIG. 1 and its open position. In the open position of the lid 14, the interior of the receptacle 13 is freely accessible so that the aforementioned solid ingredients only, or such solid ingredients as well as at least a part of the liquid ingredients, can be poured into the interior of the receptacle 13, and thus into the interior of the housing 11, prior to the commencement of the operation of the kitchen appliance 10. When all such ingredients are present in the interior of the housing 11 in the required proportions, the lid 14 can be closed and the ingredients are mixed in a manner which will be discussed in some detail later on and which is more fully described in the aforementioned copending application, in order to convert such ingredients into the pasta material of the desired consistency. In order not to have to open the lid 14 every time some additional liquid is to be added to the contents of the receptacle 13 after the operation of the kitchen appliance has been commenced, the lid 14 is provided with a depression 16 which has a slot at its bottom so that any such additional liquid poured into the depression 16 will gradually flow through such slot into the interior of the receptacle 13 to be added to the contents thereof while the operation of the kitchen appliance 10 is continued, without having to fear that any of such contents would spill and soil the exterior of the housing 11. Preferably, at least the material of the lid 14 is resilient, and the receptacle 13 is provided with a recess in which the handgrip 15 engages with snap action to hold the lid 14 in its closed position.

The housing 11 also includes a front wall 17 which is connected to the remainder of the housing 11 by two threaded connectors 18, such as nuts threaded onto externally threaded pins or bolts rigidly connected to the remainder of the housing 11 and projecting through corresponding holes in the front wall 17 frontwardly beyond the latter. This expedient renders it possible to detach the front wall 17 from the remainder of the housing 11, such as for cleaning purposes and/or to gain access into the interior of the housing 11. The front wall 17 supports, in a manner yet to be discussed, a perforated plate or extrusion die 19 which, in the illustrated construction, is provided with a plurality of cross-sectionally circular orifices 20 that are so dimensioned as to produce spaghetti 21, as the pasta material is expelled from the interior of the housing 11 to its exterior through the orifices 20.

As mentioned before, the emphasis throughout the present application will be put on the production of spaghetti. Yet, it will become apparent as the description proceeds that the kitchen appliance 10 need not, and usually will not, be so limited as to its usefulness and capability. Rather, more often than not, such a kitchen appliance will be marketed with a full complement of interchangeable extruding implements or dies provided with orifices or slots of different shapes and sizes for producing different pasta or dough products. This will increase the versatility and, consequently, the consumer appeal of such a kitchen appliance 10. When so equipped, the kitchen appliance will be capable of conversion between the production of narrow, solid and cross-sectionally round products, such as spaghetti, or solid and cross-sectionally flat or rectangular products, such as noodles, lasagna or fettucine, or sheet-like products, such as pizza crusts or taco shells, or large, solid and cross-sectionally round products, such as dough strands for making bagels, pretzels or breadsticks, or cross-sectionally tubular products, such as macaroni or manicotti. In each instance, a die having differently shaped and dimensioned orifices, openings or slots will be used instead of the die 19 having the spaghetti-producing orifices 20. As a matter of fact, such a replacement die could have as little as a single orifice or slot for producing large-dimension pasta or dough products. It will be appreciated that the size and shape of the orifices, as well as the number thereof, will be determined by the desired cross-sectional shape of the product.

Experience with the kitchen appliance 10 as described so far has shown that, in order to keep the possibility that the spaghetti 21 would adhere to one another after leaving the orifices 20 to a minimum, the pasta material must have a compact consistency, that is, it must be quite dry, as it leaves the orifices 20 so that the degree of surface tackiness of the spaghetti 21 or similar pasta or dough products is low. This brings about a number of problems which have been discussed in more detail before. However, it will be appreciated that the spaghetti 21 cannot touch one another immediately after leaving the orifices 20; rather, they must travel a certain distance before their trajectories can come so close to one another that the spaghetti 21 can touch each other and stick to one another.

According to the present invention, this situation is utilized for drying the spaghetti 21 or similar pasta or dough products at least at their exposed surfaces after they have left the orifices 20 and before their trajectories have come so close as to bring about the danger of adhering thereof to one another if untreated. More particularly, a stream of air, indicated by arrows in the drawing, is directed against the spaghetti 21 in direction substantially normal thereto. The stream of air is generated in the housing 11 in a manner which will be discussed below and leaves the latter through a grille 22 to be guided and diverted in the desired direction by a generally funnel-shaped guide 23. The guide 23 is mounted on a frame 24 which is integral with the housing 11 and is arranged around the grille 22 which, as illustrated, is disposed centrally below and slightly rearwardly of the extrusion die 19. The guide 23 is so configurated as to deflect the stream of air, which leaves the interior of the housing 11 substantially in the horizontal direction, upwardly to a direction substantially normal to the spaghetti 21. The flow of air out of the housing 11 is substantially laminar, due to the steadying influence of the grille 22. Upon reaching the spaghetti 21, this air stream flows around and between the same, and thus effectively separating them from one another, and drying the surfaces thereof at the same time. For the separating action of the air stream, it is important that the flow be laminar since otherwise the spaghetti 21 would flutter and the likelihood of contact thereof with one another before drying at their surfaces would be increased, with the deleterious consequences which are to be avoided by the present invention. It is best when the stream of air is warm or hot, since this expedites the surface drying of the spaghetti 21 or similar pasta or dough products, and thus further reduces the likelihood of mutual adhesion.

Figure 2:
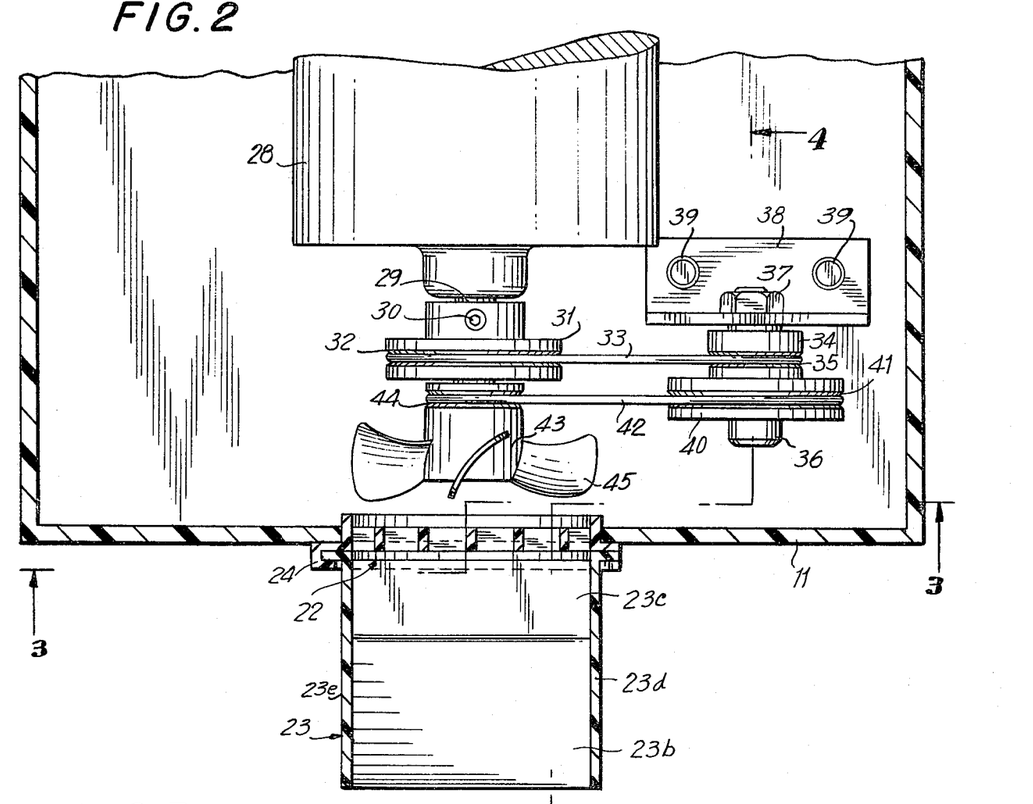
FIG. 2 is a sectional view of a portion of the kitchen appliance of the present invention taken in a plane and in a direction indicated by arrows 2—2 of FIG. 1.

FIG. 1 also shows three buttons 25, 26, and 27 which protrude out of the housing 11 and which, in the interior of the housing, are connected to conventional switches. However, instead of the three buttons, a single three-position rocker could be used, or any combination of buttons, knobs or rockers, cooperating with associated switches for controlling the operation of a reversible motor 28 accommodated in the interior of the housing 11, as shown in FIG. 2. The motor, especially an electric motor, 28 is so mounted in the housing 11 that an axis of rotation of its output shaft 29 passes through the center of the grille 22. A set screw 30 connects the hub of a pulley 31 to the output shaft 29 of the motor 28 so that, when the motor 28 is energized by actuating the buttons 25, 26, and 27 (the actuation of buttons 26 and 27 causes the motor 28 to operate in the forward mode, the actuation of buttons 25 and 26 causes motor operation in the reverse mode, and non-actuation of the buttons stops the motor 28), the pulley 31 rotates at the same angular speed as the output shaft 29 of the motor 28.

The pulley 31 has an annular groove 32 on its periphery, and an endless transmission element 33 of a circular cross section is partially received in the groove 32. Another pulley 34 which is also provided with a circumferential groove 35 partially receiving the transmission element 33 is mounted for rotation about an axle 36 which is connected, by means of a nut 37, to a bracket 38 which, in turn, is secured to the bottom wall of the housing 11 by two screws 39. The axis of the axle 36 is parallel to and laterally offset from the axis of the output shaft 29 of the electric motor 28.

A further pulley 40 provided with a circumferential groove 41 is also mounted on the axle 36, and is connected to or, as shown, integral with, the pulley 34 so as to rotate at the same angular speed as the latter. Another endless transmission element 42 of a circular cross section is trained around the pulley 40 and partially received in the groove 41, as well as around yet another pulley constituted by a hub 43, being partially received in still another groove 44 provided in the periphery of the hub 43. The hub 43 carries a plurality of impeller blades 45 and is mounted on the output shaft 29 of the motor 28 for free rotation relative thereto. The elements 30 to 44 constitute a step-up transmission which causes the impeller blades 45 to orbit the axis of the output shaft 29 at an angular speed substantially exceeding that of the output shaft 29 itself.

Figure 3:
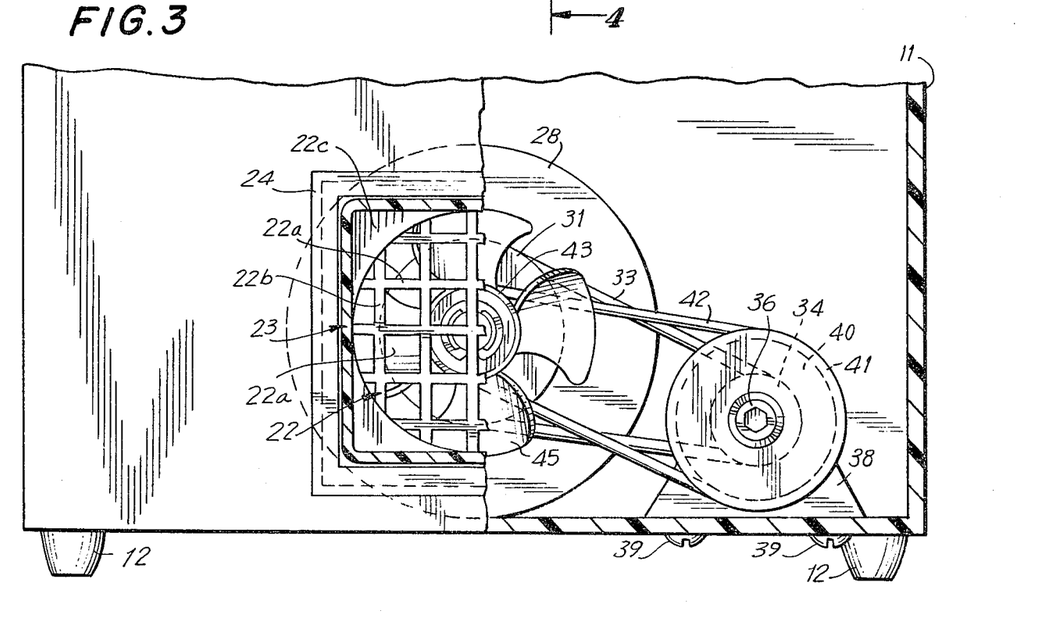
FIG. 3 is a cross-sectional view of another portion of the kitchen appliance of the present invention taken on line 3—3 of FIG. 2.

As shown in FIG. 3, the grille 22 consists of two arrays of intersecting slats 22a and 22b, as well as four corner portions 22c which together define a circular opening 22d in the grille 22 through which the air impelled by the impeller blades 45 exits into the guide or duct 23 when the output shaft 29 of the motor 28 rotates in the forward mode.

Figure 4:
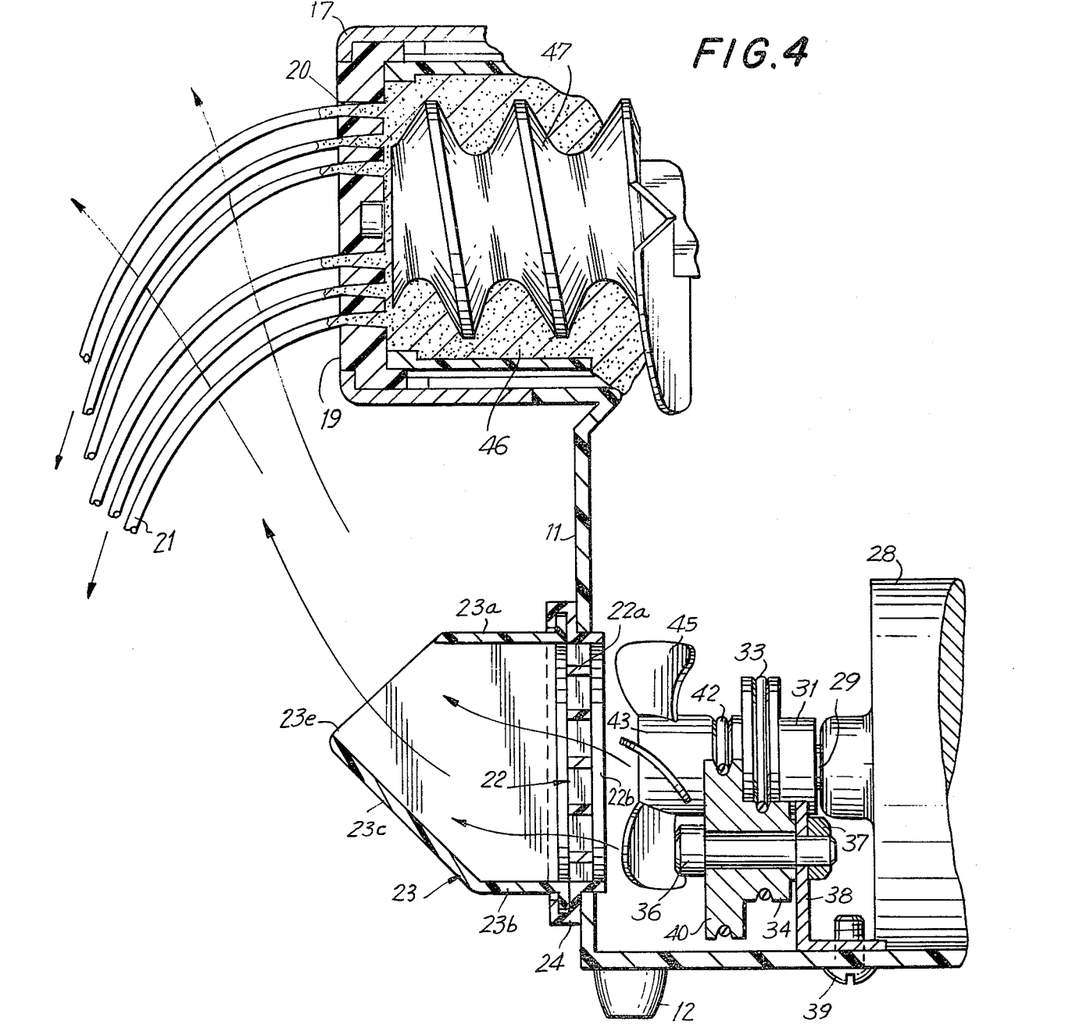
FIG. 4 is a cross-sectional view of still another portion of the kitchen appliance of the present invention taken on line 4—4 of FIG. 2.

As illustrated in FIG. 4, the air stream exiting through the spaces between the slats 22a and 22b flows in a substantially horizontal direction at first into an upstream section of the channel in the guide or duct 23, which upstream section is defined by a substantially horizontal upper wall 23a, a substantially horizontal section 23b of a lower wall, and two substantially vertical lateral walls 23d (FIG. 3) and 23e of the duct 23. However, shortly after entering the upstream section of this channel, the air stream encounters an inclined section 23c of the lower wall, which causes the air stream to change its direction from substantially horizontal to a direction enclosing an angle of 45° or more with the horizontal, so that the air stream will contact the spaghetti 21 or similar pasta or dough products immediately upon their emergence from the orifices 20. Also, the convergence of the inclined section 23c with the upper wall 23a results in a reduction of the flow-through cross-sectional area of the channel defined by the duct or guide 23 in the downstream direction, so that the speed of flow of the air is increased between the entrance and the exit of the duct 23, which contributes to vigorous action of the air on the spaghetti 21 with attendanct stripping of the layer of moist air from the area immediately adjacent to the respective surface to be dried. Yet, the flow of air remains streamlined even after existing from the duct 23 so that the air stream holds the individual spaghetti 21 apart and does not cause the same to oscillate or swing to an extent which would bring the spaghetti 21 in contact with one another before they have dried to such a degree that adhesion thereof to one another is prevented.

FIG. 4 also shows that the body of pasta material, indentified by the reference numeral 46, is expelled through the orifices 20 by a conveyor screw 47 which is also rotated from the output shaft 29, but from the other end thereof which projects from the casing of the motor 28 at the other axial end thereof. Details of the power transmission between the motor 28 and the conveyor screw 47 have been omitted from the drawing since they do not form a part of this invention, but they can be ascertained, if need be, from the aforementioned co-pending application. It is also illustrated in FIG. 4 that the orifices 20 converge in the extruding direction so that the pasta or dough material 46 passing thereto is additionally compressed, which improves its consistency. The conveyor screw 47 includes a stub shaft 48 which is supported in a correspondingly configurated bore of the extrusion die 19.

Figure 5:
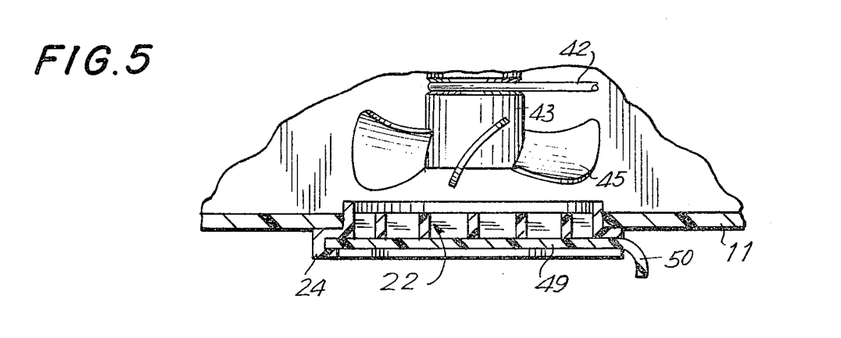
FIG. 5 is a sectional view similar to that of FIG. 2 but showing only a modified detail thereof.

As shown in FIG. 1, the substantially horizontal section 23b of the lower wall can be omitted so that the inclined wall section 23c commences immediately at the grille 22. This somewhat simplifies the construction and manufacture of the guide 23 without detrimentally affecting the flow pattern of the air stream. It may also be seen in FIG. 1 that the frame 24 surrounds the upstream end of the duct or guide 23, which is configurated as a flange, only on three sides so that the guide 23 can be slid out of the frame 24 through the open side thereof. Then, if desired, a closing plate 49 can be substituted, in a manner which will become apparent upon comparison of FIGS. 1 and 5, for the duct 23 so that the kitchen appliance 10 can be operated without directing any air stream against the spaghetti 21 or similar products. The closing plate 49 has a handgrip portion 50 which is bent out of the plane of the plate 49 and enables the user of the appliance 10 to manipulate the closing plate 49.

Having so explained the structural features of the kitchen appliance 10 as constructed in accordance with the present invention, the operation thereof will now be briefly discussed. As mentioned before, the solid and liquid ingredients of the farinaceous material are first introduced into the interior of the receptacle 13 through which they travel toward the conveyor screw 47. Then, the motor 28 is energized for operation in the reverse mode, so that the ingredients will be mixed with one another and converted into pasta or dough material 46, without being conveyed by the conveyor screw 47 toward the extrusion die 19. The reverse operation of the motor 28 is continued until the material 46 is sufficiently mixed, whereupon the motor 28 is stopped and restarted in the forward mode. Under these circumstances, the conveyor screw 47 kneads and forces the material 46 toward the extrusion die 19 and finally through the orifices 20 thereof, and this operation is continued until the supply of the material 46 is exhausted.

During the operation in the reverse or mixing mode, the output shaft 29 may be rotated, for instance, at 3200 r.p.m. The step-up transmission 30 to 44 is so designed that the blower consisting of the hub 43 and impeller blades 45 rotates at, for instance, approximately four times the speed of the output shaft 29, that is, at about 12,800 r.p.m., and the sense of rotation is such that air is being drawn into the interior of the housing 11 through the grille 22 and the duct 23, if such is mounted on the frame 24, unless the entry of air is prevented by the plate 49. The air stream is directed against the motor 28 and cools the same, again unless the entry of such cooling air is prevented by the covering plate 49. It may be advantageous to use this plate 49 at this point in order to let the motor 29 achieve a desired temperature, for the reason which will be mentioned below.

In the forward or kneading and extruding mode of operation, the output shaft 29 of the motor 28 rotates in the opposite direction at, for example, about 2500 r.p.m. Since the ratio of the step-up transmission 30 to 44 is unchanged, the blower 43, 45 rotates at about 10,000 r.p.m. and draws air past and/or through the motor 28 to cool the latter and to become warm or hot at the same time. This warm or hot air is then expelled into the duct or guide 23 and finally reaches the spaghetti 21 or similar products. Now it will be appreciated why operation in the reverse mode with the closing plate in position may be advantageous in some circumstances: it permits the motor 28 to reach the temperature needed for effectively drying the spaghetti 21 or similar products when operating in the forward operating mode.

Finally, it is to be mentioned that, as seen in FIG. 4, the extrusion die 19 is merely held behind a flange of the forward wall 17 and in an opening thereof, so that it can be easily expelled, for instance, upon removal of the forward wall 17 from the remainder of the housing 11, and replaced by a different extrusion die capable of producing differently shaped products.

Figure 6:
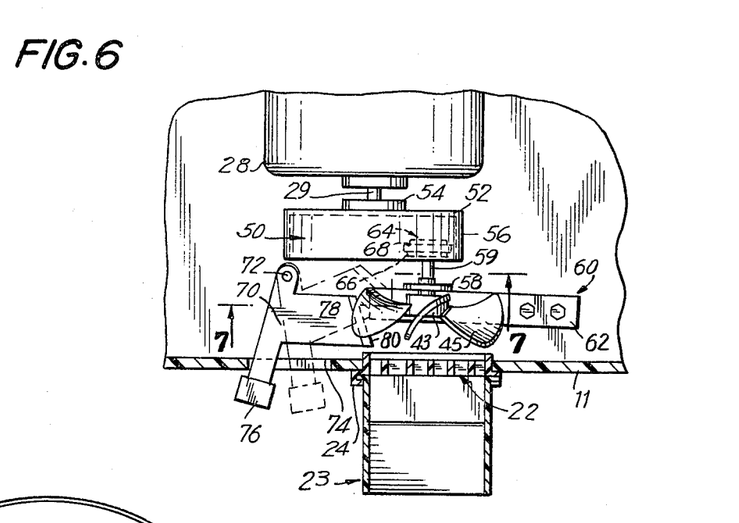
FIG. 6 is a broken-away top plan view of a pasta-making kitchen appliance constructed in accordance with another embodiment of the present invention.
Figures 7, 8:
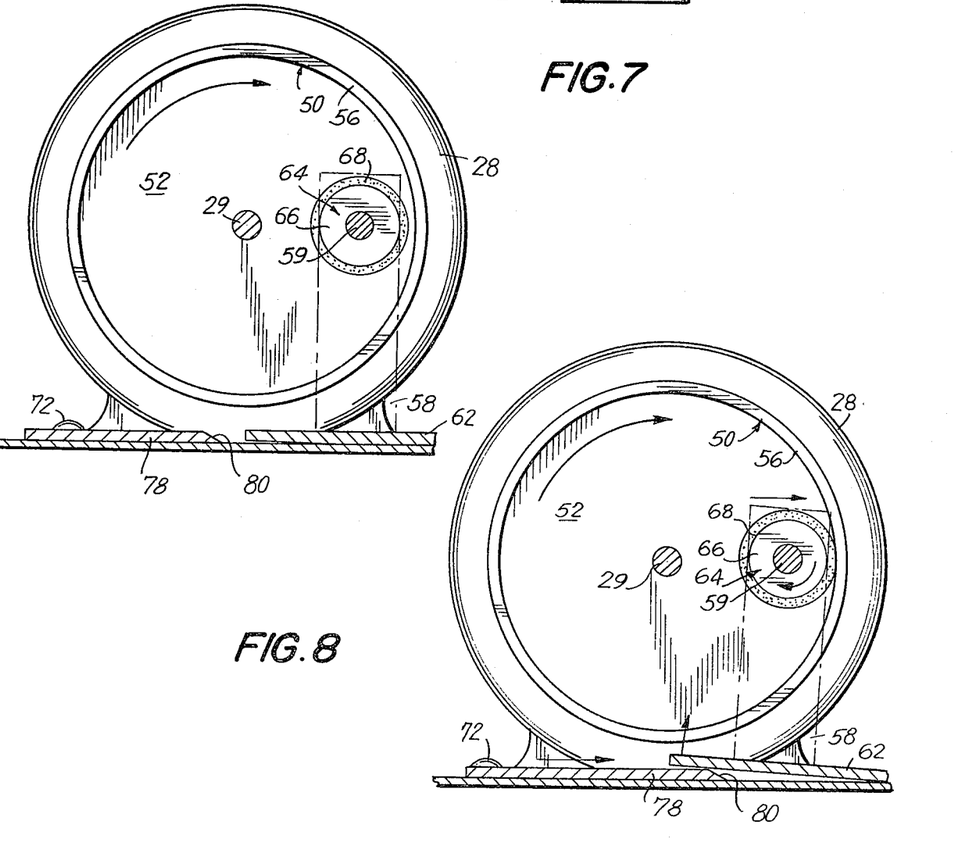
FIG. 7 is a sectional view of a portion of the kitchen appliance of the present invention in one operative condition taken in a plane and in a direction indicated by arrows 7—7 of FIG. 6.
FIG. 8 is a sectional view similar to that of FIG. 7 but in another operative condition.

Turning now to the embodiment of FIGS. 6–8, which is currently preferred over the previous embodiment of FIGS. 1–5, like parts have been identified with like reference numerals. Hence, the motor 28 has an output shaft 29 on the free end portion of which is mounted for joint rotation therewith a first clutch element 50. First clutch element 50 is cup-shaped and has a circular support wall 52 formed with a hub 54 that is rigidly mounted on the output shaft, and a circular flange 56 formed of one-piece plastic construction with the circular wall 52 and circumferentially surrounding the output shaft 29 in concentric relationship. A stub shaft 59 is journably mounted on a vertical support portion 58 of an L-shaped cantilever bracket 60. A horizontal support portion 62 is secured only at its end away from the vertical portion 58 to the base of the housing 11. The blower 43,45 is mounted for joint rotation at one end of the stub shaft 59, and a second clutch element 64 is mounted at the opposite end of the stub shaft. The second clutch element 64 is a circular plastic pulley 66 having a circumferential groove formed about its periphery, and includes a friction belt 68 or O-ring of rubber material snugly retained in the circumferential groove. The stub shaft 59 is positioned in the housing such that the friction belt 68 is located within the cup-shaped clutch element 50, and particularly within the confines of the circular flange 56.

The transmission also includes a manually-operable actuating lever 70 pivotally mounted within the housing at pivot 72 and extending outwardly from the housing through a slot 74 formed in the external front wall of the housing. A hand grip portion 76 is provided at the free end of the lever 70. The lever 70 also has intermediate the pivot 72 and hand grip portion 76 an actuator portion 78 formed with a leading knife-like tapered edge 80.

The lever 70 is manually reciprocally movable between a disengaged and an engaged position respectively shown in solid and dashed lines in FIG. 6. The lever 70 changes the relative position of the clutch elements 50,64 between the disengaged position shown in FIG. 7 and the engaged position shown in FIG. 8. In the disengaged position, the friction belt 68 is out of engagement with, and is spaced away from, the inner circumferential wall of the flange 56. In order to move the friction belt 68 into engagement with the inner circumferential wall of the flange 56 as shown in FIG. 7, the user moves the lever 70 such that its leading edge 80 is displaced underneath the cantilevered horizontal portion 62 of the bracket 60. The tapered leading edge 80 urges the cantilevered horizontal portion 62 generally upwardly along an arc until the friction belt 68 of the clutch element 64 is swung into engagement with the flange 56. As best shown in FIG. 7, the cantilevered horizontal portion 62 of the bracket 60 is normally slightly raised from the base plate of the housing in order to facilitate the sliding movement of the tapered edge 80 of the lever 70 underneath the horizontal portion to raise the latter. In the engaged position, the pulley 66 is rotated at an angular speed in excess of that of the clutch element 60. The first and second clutch elements 50,64 constitute a step-up transmission means whose step-up ratio is proportional to the diameters of the circular belt 68 and the circular flange 56. The dimensions of the belt 68 and flange 56 can, of course, be adjusted to the desired angular speed required for the blower.

The operation of the embodiment of FIGS. 6–8 is analogous to the earlier embodiment. When the motor is operating in the forward mode, the user may move the lever 70 to its engaged position, whereby the blower impels air towards the pasta as described previously to dry the same. When the motor is operating in the reverse mode, movement of the lever to its engaged position will cause air to flow back over the motor and the internal parts of the appliance to cool the same. Whenever air flow is not desired, the user moves the lever back to its disengaged position, whereupon no rotational movement from the motor is transmitted to the blower. This feature eliminates the previous requirement of a cover plate.

It will be understood that each of the elements described above; or two or more together, may also find a useful application in other types of arrangements differing from the types described above.

While the present invention has been illustrated and described as embodied in a household pasta-making appliance, it is not intended to be limited to the details shown, since various modifications and structural changes may be made without departing from the spirit of the present invention in any way.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a kitchen appliance for producing elongated products from farinaceous materials, a combination comprising:
    (a) housing means having a support base and an internal chamber for accommodating a quantity of the respective farinaceous material and including an external wall substantially perpendicular to the support base;
    (b) an extrusion die having a die plate mounted on said wall and substantially parallel to said external wall and having at least one opening communicating between said internal chamber and the exterior of said housing means;
    (c) means for expelling said material through said opening in the form of the respective elongated products;
    (d) means for driving said expelling means; and
    (e) means for directing a stream of air against and in direct contact with the elongated product at an open-air, unconfined circumambient region of the latter adjacent to the point of the emergence thereof from said opening of said extrusion die plate for drying at least the surface of such elongated product and reducing its tackiness, said means for directing being such as to direct said airstream in an upward direction toward such elongated product from below the product for preventing surface adhesion of such elongated product with nearby surfaces.

2. The combination as defined in claim 1, wherein said directing means includes blower means; means for supporting said blower means in said housing means; means for rotating said blower means; and means for guiding the stream of air impelled by said blower means toward said region.

3. The combination as defined in claim 2, wherein said housing means includes an opening at said external wall; wherein said driving means includes an electric motor that has an output shaft; wherein said blower means is mounted in rotatable relationship with said output shaft within said housing means; and wherein said guiding means includes a duct defining a channel communicating with said opening of said housing means and aimed at said region.

4. The combination as defined in claim 3, and further comprising means for heating the air impelled by said blower means.

5. The combination as defined in claim 4, wherein said electric motor has portions which become heated during the operation of said electric motor; and wherein said heating means includes means for conducting the air past such heated portions of said electric motor prior to reaching said blower means.

6. The combination as defined in claim 3, and further comprising means for streamlining the flow of air impelled by said blower means prior to entering said duct, including a grille interposed in said opening of said housing means.

7. The combination as defined in claim 6, wherein said grille includes two intersecting arrays of parallel slats, the slats of one array extending substantially at right angles to the slats of the other array.

8. The combination as defined in claim 7, wherein said duct is substantially rectangular in cross section; and wherein said grille is conformingly rectangular and includes corner portions which together define a circular opening aligned with said blower means and traversed by said slat arrays.

9. The combination as defined in claim 3, wherein said housing means includes a frame around said opening thereof; and wherein said duct is mounted on said frame.

10. The combination as defined in claim 9, wherein said frame is substantially rectangular; and wherein said duct is conformingly rectangular in cross section.

11. The combination as defined in claim 10, wherein said frame is arranged centrally below said extrusion die; and wherein said duct includes a substantially horizontal upper wall, two opposite substantially vertical lateral walls, and a bottom wall including at least a section which is inclined at a predetermined acute angle with respect to the horizontal to divert the air stream emerging substantially horizontally out of said opening of said housing means upwardly toward said region.

12. The combination as defined in claim 9, wherein said frame is open at one side; and wherein said duct is mounted on said frame for sliding displacement relative thereto through said open side for removal from said housing means.

13. The combination as defined in claim 12, and further comprising a closing plate which can be mounted on said frame instead of said duct for obstructing said opening of said housing means.

14. The combination as defined in claim 3, wherein said rotating means includes a transmission interposed between said output shaft and said blower means and operative for rotating said blower means at an angular speed exceeding that of said output shaft.

15. The combination as defined in claim 14, wherein said output shaft has an end portion extending toward said opening of said housing means; wherein said blower means is mounted on said end portion of said output shaft for free rotation relative thereto; and wherein said transmission includes a first pulley mounted on said output shaft for joint rotation therewith, a second and third pulley mounted in said housing means for joint rotation about an axis parallel to and laterally offset from said output shaft, a fourth pulley rigid with said blower means, and a first and a second endless element respectively trained about said first and second, and said third and fourth, pulleys.

16. The combination as defined in claim 14, wherein said blower means is mounted on a stub shaft for joint rotation about an axis laterally offset from said output shaft; wherein said transmission includes clutch means movable between a disengaged position in which the output and stub shafts are operatively disengaged, and an engaged position in which the output and stub shafts are operatively engaged in rotatable relationship; and wherein said transmission includes an actuator means for moving said clutch means between its positions.

17. The combination as defined in claim 16, wherein said clutch means includes a first clutch member mounted on said output shaft for joint rotation therewith, and a second clutch member mounted on said stub shaft for joint rotation therewith; and wherein said actuator means includes a manually-operable member pivotally mounted on said housing means and extending beyond said external wall thereof.

18. The combination as defined in claim 17, wherein said first clutch member has an annular support wall mounted rigid with said output shaft, and a circular flange circumferentially surrounding said output shaft; wherein said second clutch member includes a circular pulley having a circular friction belt thereabout; wherein the diameter of said pulley is less than the diameter of said flange; and wherein said friction belt of said pulley engages the inner circumferential surface of said circular flange in said engaged position.

* * * * *